July 17, 1928.
H. F. FREASE
1,677,714
TUBULAR STRUCTURE
Filed Dec. 29, 1924
2 Sheets-Sheet 1
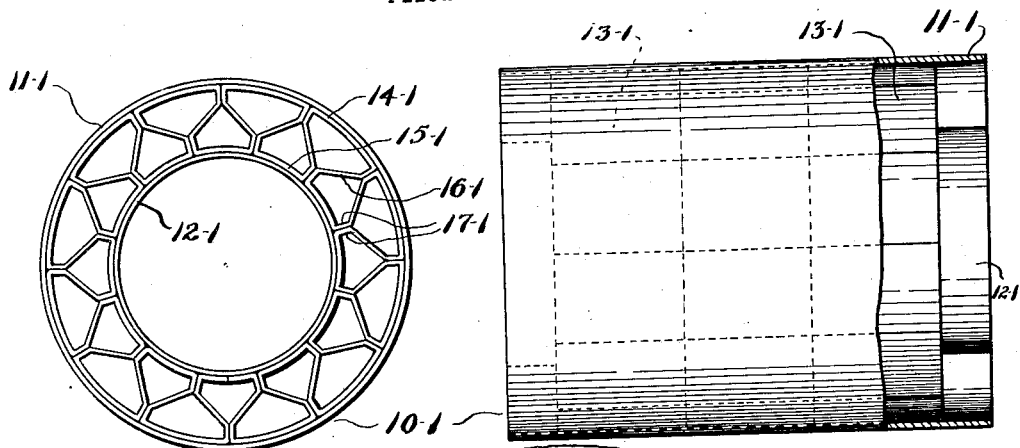
Fig. 1
Fig. 2
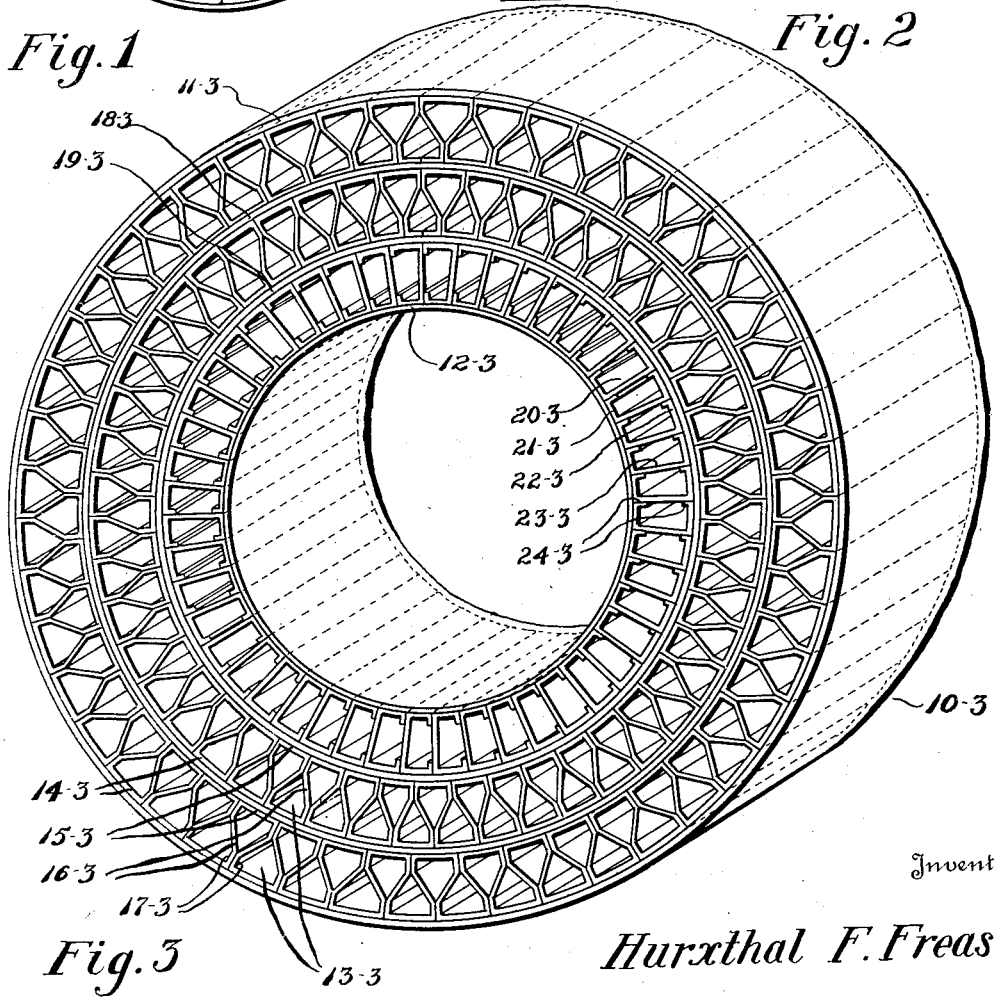
Fig. 3
Inventor
Hurxthal F. Frease
By Frease and Bond
Attorneys Inventor
Hurxthal F. Frease Patented July 17, 1928.

1,677,714

UNITED STATES PATENT OFFICE.

HURXTHAL F. FREASE, OF CANTON, OHIO.

TUBULAR STRUCTURE.

Application filed December 29, 1924. Serial No. 758,622.

The invention relates to tubular structures having a comparatively great over all cross-sectional area, and a comparatively small cross-sectional area of structural parts, for use among other things as vacuum pipes, culverts, sheet metal columns, and the like; and the objects of the invention are to provide tubular structures having great strength against all types of loading, whether due to the weight of the structures themselves, the application of external forces, or the thermal actions of expansion and contraction.

These and other objects are attained in structures adapted to economical production by the use of circumferentially continuous tubes and co-operating and abutting positioning or spacer, and truss or reinforcing means, slidable upon each other, when desired, for permitting independent expansion and contraction of the parts.

Several forms of the invention are illustrated in the accompanying drawings, forming part hereof, in which—

Figure 4:
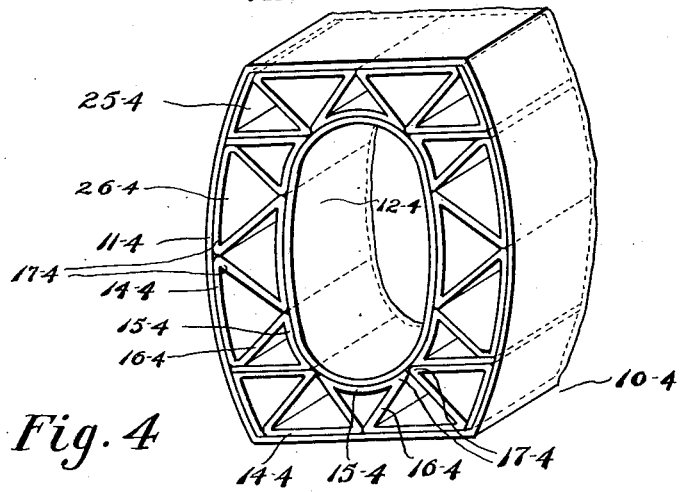
Figure 5:
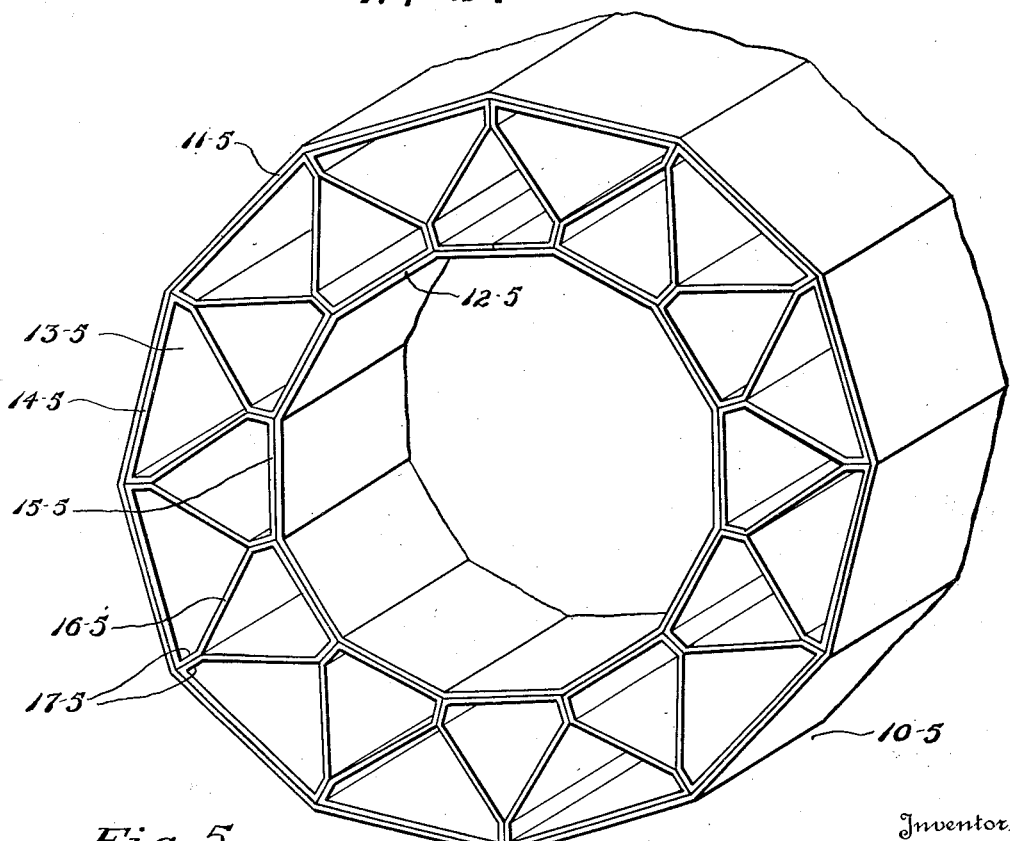

Figure 1 is an end elevation of a cylindrical tubular structure having inner and outer spaced and trussed tubular walls;

Fig. 2, a side elevation of the same, a portion of the outer tubular wall being in section to show the inner tubular wall and a truss and spacer unit;

Fig. 3, an oblique perspective view of a cylindrical tubular structure having a plurality of spaced and trussed tubular walls;

Fig. 4, an oblique perspective view of a tubular structure having differentially formed inner and outer spaced and trussed walls; and Fig. 5, an oblique perspective view of tubular structure having inner and outer spaced and trussed polygonal tubular walls.

Similar numerals refer to similar parts throughout the drawings.

While the structural parts illustrated in the drawings indicate, for the sake of convenience and clearness, continuous sheet, plate, or strip material; it is to be understood that any of the parts of the tubular structures may consist of a number of sheets, plates, or strips secured to each other by rivets, welding or other fastening means; and/or may be perforated, made of expanded metal, corrugated, or otherwise formed; or may be otherwise made up of a plurality of parts.

Referring to Figs. 1 and 2, a cylindrical tubular structure $10^1$ includes the outer cylindrical tube $11^1$, and the inner cylindrical tube $12^1$, spaced and maintained in load resisting relationship with each other by the plurality of abutting truss and spacer units $13^1$.

The units $13^1$ are preferably made from a continuous strip of material, and include outer chord members $14^1$, inner chord members $15^1$, and connecting web members $16^1$ and apex abutments $17^1$, forming circumferentially continuous trusses.

The inner and outer chord members preferably abut and conform to the inner surfaces of the tubes; and the tubes and the truss and spacer units abut each other, as illustrated, in such a way that deflection of the wall of either tube is inherently resisted by the truss and spacer units, without necessarily requiring any riveted, welded or other connection of the apex abutments of the truss units to each other, or of the chord members to the tube walls.

It is to be understood however that such connections may be used, when desired.

The cylindrical tubular structure $10^3$ illustrated in Fig. 3, is a modified form of the invention, in which the outer cylindrical tube $11^3$, inner cylindrical tube $12^3$ and intermediate cylindrical tubes $18^3$ and $19^3$ are spaced and maintained in load resisting relationship with each other by the abutting truss and spacer units $13^3$ and the longitudinal abutting spacer and reinforcing channel units $20^3$.

The units $13^3$ which space and truss the tubes $11^3$, $18^3$ and $19^3$, include outer chord members $14^3$, inner chord members $15^3$, and connecting web members $16^3$ and apex abutment $17^3$ preferably made from a single continuous strip in a manner similar to that already described for the unit $13^1$.

The abutting spacing and reinforcing means between the intermediate tube $19^3$ and the inner tube $12^3$ consists of a plurality of longitudinal spacer and reinforcing channel units $20^3$, each including inner chord walls $21^3$, outer chord walls $22^3$, web walls $23^3$ and abutment legs $24^3$.

These units are adapted to be manufactured by sheet metal channel forming equipment, and when associated with inner and outer tubes as illustrated, cooperate and abut with each other to space and maintain the same in a manner similar to that already described for the continuous truss and spacer units 13¹ and 13³.

The tubular structure 10⁴ illustrated in Fig. 4, discloses the invention as applied to an irregular structure, in which the differentially formed outer tube 11⁴ and inner tube 12⁴ are spaced and maintained in load resisting relationship with each other by the abutting truss and spacer units 25⁴, and 26⁴, each including outer chord members 14⁴, inner chord members 15⁴, and connecting web members 16⁴ and apex abutment 17⁴, preferably made as shown from continuous strips of material, the chord members conforming to and abutting the inner surfaces of the tubes in a manner similar to that described for the cylindrical structures.

Fig. 5 illustrates a tubular structure 10⁵ including the outer polygonal tube 11⁵, and the inner polygonal tube 12⁵ spaced and maintained in load resisting relationship with each other by an abutting truss and spacer unit 13⁵, which includes outer chord members 14⁵, inner chord members 15⁵, and connecting web members 16⁵ and apex abutments 17⁵, preferably made from a continuous strip of material, the chord members conforming to and abutting the inner surfaces of the tubes in a manner similar to that described for the foregoing structures.

It is to be understood that a desirable form of the invention consists of circumferentially continuous, inner and outer tubular walls spaced and maintained in load resisting relationship with each other by mutually cooperating and abutting spacer and reinforcing units, which need not necessarily be secured either to each other or to the tubes. However, by "circumferentially continuous tube" is not necessarily meant only such a tube as a seamless tube, a welded tube or the like, but may be any combination of associated parts connected to each other in such a way as to form a structure whose cross sectional outline is that of a circumferentially continuous tube.

I claim:

1. A main structural member adapted for resisting all types of loading, and including a central tube and a plurality of longitudinally extending and circumferentially connected tubular members abutting each other and the central tube.

2. A main structural member adapted for resisting all types of loading, and including a central tube and a plurality of longitudinally extending and circumferentially connected tubular members abutting each other and slidable on the tube.

3. A main structural member adapted for resisting all types of loading, and including a central tube and a plurality of longitudinally extending and circumferentially connected triangular tubular members abutting each other and the central tube.

4. A main structural member adapted for resisting all types of loading, and including an outer tube, an inner tube spaced within the outer tube, and a plurality of longitudinally extending and circumferentially arranged tubular members abutting each other and the tubes.

5. A main structural member adapted for resisting all types of loading, and including an outer tube, an inner tube spaced within the outer tube, and a plurality of longitudinally extending and circumferentially connected tubular members abutting each other and the tubes.

6. A main structural member adapted for resisting all types of loading, and including an outer tube, an inner tube spaced within the outer tube, and a plurality of longitudinally extending and circumferentially arranged tubular members abutting each other and slidable between the inner and outer tubes.

7. A main structural member adapted for resisting all types of loading, and including an outer tube of one cross section, an inner tube of another cross section spaced within the outer tube, and a plurality of longitudinally extending and circumferentially arranged tubular members abutting each other and the tubes.

8. A main structural member adapted for resisting all types of loading, and including an outer tube, an inner tube spaced within the outer tube, and a plurality of longitudinally extending and circumferentially arranged U members abutting each other and the tubes.

In testimony that I claim the above, I have hereunto subscribed my name.

HURXTHAL F. FREASE.